C. G. SURBER.
NUT LOCK.
APPLICATION FILED APR. 2, 1919.
1,359,287.
Patented Nov. 16, 1920.
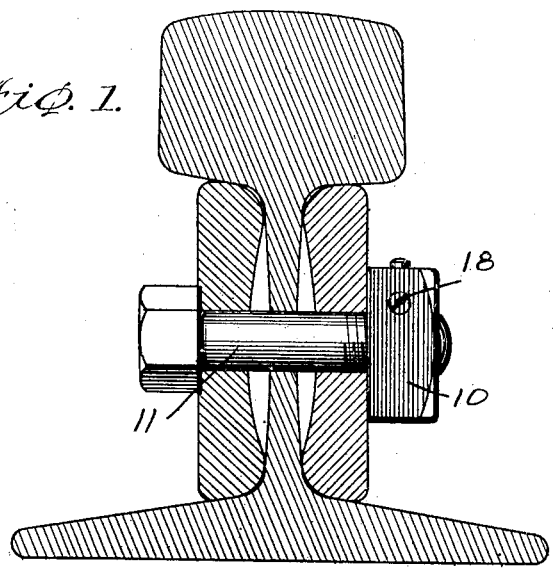
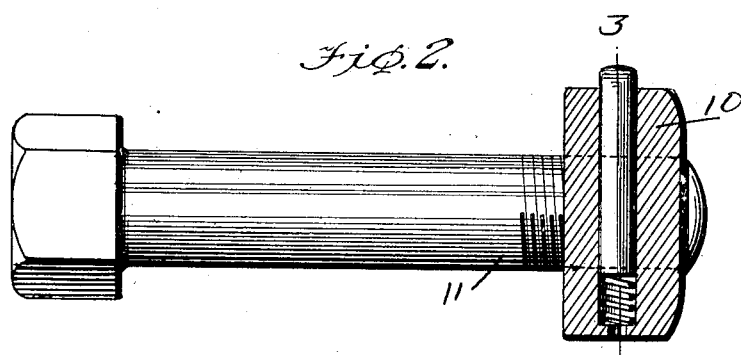
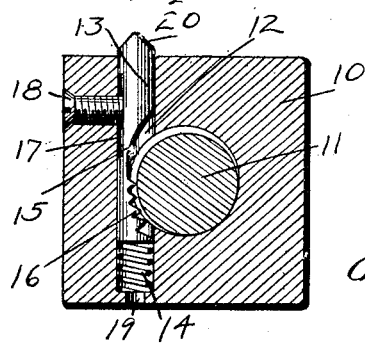
WITNESSES
R. E. Rousseau.
INVENTOR
Charles G. Surber,
BY
ATTORNEYS

UNITED STATES PATENT OFFICE.

CHARLES G. SURBER, OF RICHMOND, VIRGINIA.

NUT-LOCK.

1,359,287.  Specification of Letters Patent.  Patented Nov. 16, 1920.

Application filed April 2, 1919. Serial No. 286,890.

*To all whom it may concern:*

Be it known that I, CHARLES G. SURBER, a citizen of the United States, and a resident of Richmond, in the county of Henrico and State of Virginia, have invented certain new and useful Improvements in Nut-Locks, of which the following is a specification.

My present invention relates generally to nut locks, and more particularly to nut locks of the thread gripping type, in which the nut has means in connection therewith, which will automatically act to grip the threads of a bolt, my object being the provision of simple, inexpensive means toward the desired end which will have the advantages of greater ease of manufacture and assembly, as well as greater durability in use, over the devices of the same general nature, heretofore proposed.

In the accompanying drawing which illustrates my present invention and forms a part of this specification, Figure 1 is a sectional view illustrating the practical application of my invention, Fig. 2 is a side view of a bolt, the nut proposed by my invention being in section thereon, and Fig. 3 is a transverse section taken substantially on line 3—3 of Fig. 2.

Referring now to these figures, my invention proposes a nut such as indicated at 10 in the several figures, and which is as usual provided with a central main bore, threaded to screw upon the threaded end of a bolt 11. My invention further proposes the provision of a second bore indicated at 12, and as seen in Figs. 2 and 3, in the nut 10, at right angles to the main bore and partially intersecting the same as particularly seen in Fig. 3, so as to receive in a portion thereof, a certain small portion of the threaded periphery of the bolt 11 when the nut is screwed on the bolt.

In the bore 12 is disposed a locking pin 13, whose inner end is engaged by a spring 14, positioned as presently described, and whose outer end projects slightly beyond one side wrench-engaging face of the nut 10 for manual manipulation. Intermediate its ends, the pin 13 has a concaved recess 15 opposite the main threaded bore of the nut 10, the pin 13 having portions extending upon relatively opposite sides of the main bore thereof, as plainly seen.

The wall of the recess 15 is furthermore provided at one side with transversely extending notches, forming a series of thread gripping teeth 16, which upon lengthwise shifting movement of the pin 13 under tension of the spring 14, effectively engage and lock with the threads of the bolt 11 when the nut is screwed thereon.

Opposite to its concaved recess 15 the pin has a lengthwise recess at 17 which receives the inner end of a screw 18 threaded through a portion of the nut at right angles to the pin 13, so that the lengthwise shifting movements of the pin 13 are thus limited and its complete withdrawal and accidental displacement is prevented under normal circumstances.

By reference to Figs. 2 and 3 it will be noted that the bore 12 terminates at one end in slightly spaced relation to one side wrench-engaging face of the nut through which it communicates by a smaller opening 19, thus providing for a bearing holder at the inner end of the bore 12 against which one end of the spring 14 has bearing, as well as for the introduction of an implement against the inner end of the pin to drive the latter into tight locking engagement with the bolt threads.

Thus in use, after the pin 13 has been pressed inwardly to free the teeth 16 from the bolt threads, it is apparent that the nut 10 may be readily turned and it is likewise apparent that when the nut and the pin 13 are released, the pin will be shifted in the direction of its length by the spring 14, so as to engage the teeth 16 with the bolt threads, and any further tendency of the nut to turn off of the bolt, will merely cause tighter grip of the teeth of the locking pin with the bolt threads.

For convenience, the outer end 20 of the pin 13 may be oppositely beveled as seen particularly in Fig. 3, so that when a wrench is applied to the side faces of the nut, particularly that side beyond which the exposed end of the pin 13 projects, the pin will be engaged by the wrench and automatically shift it inwardly so as to move the teeth 16 free of the bolt threads.

It is thus obvious that my invention provides a device which in view of the simple provision of a pin shiftable into the second bore of the nut, may be readily manufactured, and just as readily assembled, and it is obvious that in view of the fact that the locking pin 13 is in a single piece throughout, it presents a durable, lasting construction which will be effective and efficient throughout its life.

I claim:—

A lock nut having a threaded bolt-receiving bore, and a bore at right angles to and partially intersecting said threaded bore and terminating at its inner end in spaced relation to one face of the nut, said nut having a reduced opening therethrough at the inner end of the bore, a locking pin having a limited sliding movement lengthwise in said second bore and the inner end of which is exposed through said opening, said pin having portions extending upon relatively opposite sides of the threaded bore, one of which portions projects exteriorly of the nut, said pin having a recessed portion opposite the threaded bore and having its wall at one side of and within the recess notched to provide bolt-engaging teeth extending transversely with respect to the longitudinal axis of the pin, and a spring within the said second bore of the nut and engaging the pin to normally shift the latter in one direction, said pin having a groove, and a screw threaded through and countersunk within a portion of the nut at right angles to the pin and to the bolt receiving bore and projecting into the groove to limit movement of the pin under normal working conditions.

CHARLES G. SURBER.

Witnesses:
   H. M. SADLER, [L. S.]
   J. W. UTLEY. [L. S.]